Sept. 1, 1964 G. L. SCHUSTER 3,146,556
ABRADING MACHINE
Filed Nov. 2, 1961 4 Sheets-Sheet 1

INVENTOR.
Gordan L. Schuster
By: Stone, Nieman, Burmeister & Zummer
attys

Sept. 1, 1964　　　G. L. SCHUSTER　　　3,146,556
ABRADING MACHINE
Filed Nov. 2, 1961　　　　　　　　　　4 Sheets-Sheet 2

INVENTOR.
Gordon L. Schuster
By: Stone, Nieman, Burmeister & Zumma
attys

INVENTOR.
Gordon L. Schuster
By: Stone, Nieman, Burmeister & Zummer attys.

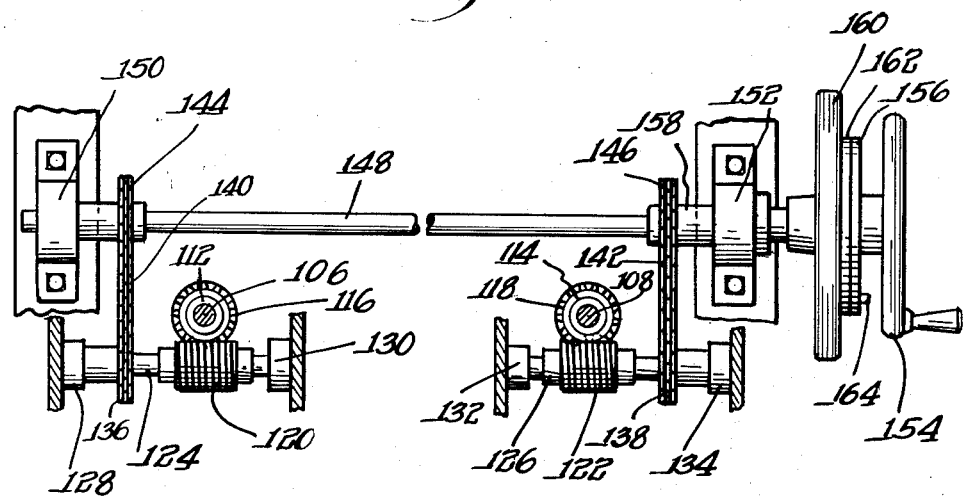
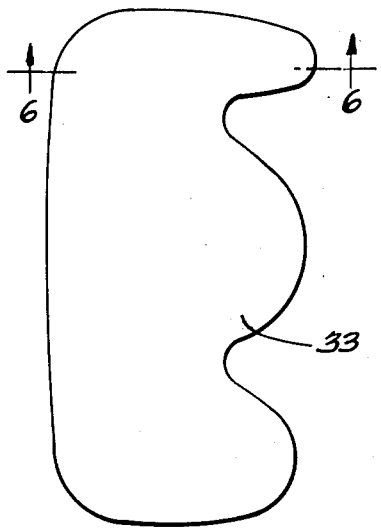
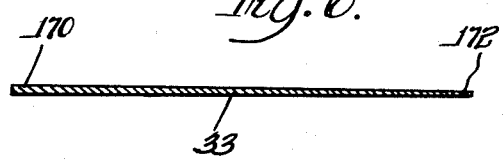

3,146,556
ABRADING MACHINE
Gordon L. Schuster, Minneapolis, Minn., assignor to
Timesavers Sanders, Inc., Minneapolis, Minn., a corporation of Kansas
Filed Nov. 2, 1961, Ser. No. 149,628
7 Claims. (Cl. 51—139)

This invention relates to an improvement in abrading machines and more particularly to an improved billy roll mount for use in an abrading machine which mount allows a billy roll to tilt relative to an abrading member in order to abrade uniformly without waste a tapered work piece.

Abrading machines have many uses, one of which is the abrasion of animal hides. Ordinarily, after an animal hide is removed from the animal, the hide is cut in half along the spine or backbone of the animal and a half hide is run through an abrading machine along the length of the hide in course of the treatment of the hide. Most hides are not uniform in thickness, inasmuch as the portion of the hide which was adjacent to the backbone is thicker than that portion which was on the underside or belly portion of the animal. It is desirable to remove the unwanted portion from the hide without cutting deeply into the remainder. However, the construction and operation of an ordinary abrading machine is such that in the abrasion of a hide either the thicker portion is abraded more than that which is desired, or the thinner portion or belly portion of the hide is not sufficiently abraded. Therefore, the abrasion of the hide is not uniform and there is occasion for a considerable amount of waste in that the hide may be severely damaged by abrading the hide too severely or insufficiently. It is therefore one of the principal objects of the hereindisclosed invention to provide an improved billy roll mount which allows the billy roll to tilt relative to an abrading surface thereby allowing a tapered hide to pass between the billy roll and the abrading surface but still maintain a uniform pressure across the billy roll so that the hide is uniformly abraded.

It is another object of the present invention to provide an adjustment device for a billy roll which allows a billy roll to be tilted selectively relative to an abrading surface and resilient means urge the billy roll toward the abrading surface.

It is a further object of the instant invention to provide a floating billy roll mount which allows the billy roll to be displaced from an abrading surface by a work piece.

It is a still further object of the hereindisclosed invention to provide a simple and inexpensive billy roll mount which is economical to produce and may be used in an abrading machine in which the billy roll tilts relative to an abrading surface.

Other objects and uses of the instant invention will become readily apparent to those skilled in the art upon a perusal of the accompanying specification in light of the appended drawings in which:

FIGURE 4 is a plan view of an adjustment device for regulating the tilt of the billy roll relative to an abrading surface which is taken on line 4—4 of FIGURE 2;

FIGURE 5 is a plan view of half a cow hide; and

FIGURE 6 is a sectional view of a cow hide taken on line 6—6 in FIGURE 5.

Figure 1:
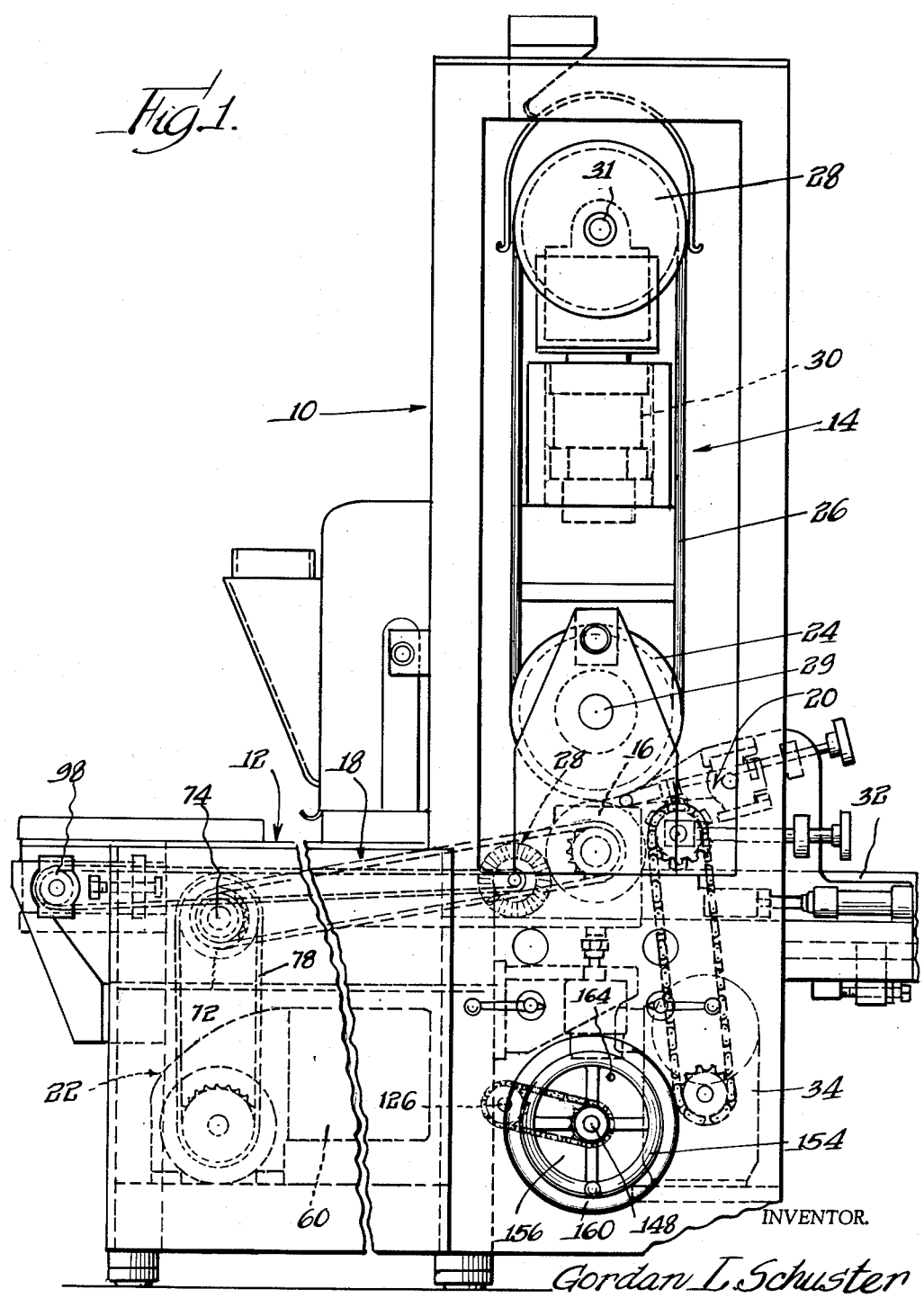
FIGURE 1 is a side elevation of an abrading machine embodying the present invention which abrading machine has portions removed in order to show better the interior construction of the machine.

Referring now to the drawings and especially to FIGURE 1, an abrading machine generally indicated by numeral 10 includes, a frame 12, an abrading assembly 14, a billy roll 16 cooperative with the abrading assembly, a billy roll mount 18 rotatably supporting the billy roll, a conventional spreader assembly 20 cooperative with the billy roll, and a billy roll drive assembly 22 connected to the billy roll.

In this instance, the abrading assembly 14 is conventional in construction in that it includes a work roll 24 which has an abrading belt 26 in engagement therewith, and the abrading belt is also in engagement with an idler roll 28 which roll is held spaced from the work roll by spacer 30 in a conventional manner. The work roll and idler roll are mounted on parallel shafts 29 and 31, respectively, and are supported by the frame 12 of the abrading machine.

The abrading machine also includes a table 32 which is connected to the frame 12 upon which work is placed and the work is moved along the table into engagement with the spreader assembly which appropriately spreads a hide 33 or other work piece before the work passes between the billy roll and the abrading belt 26. The spreader is driven by a suitable source of power which is in this instance an electric motor 34 but which spreader assembly does not constitute a part of this invention.

Figure 3:
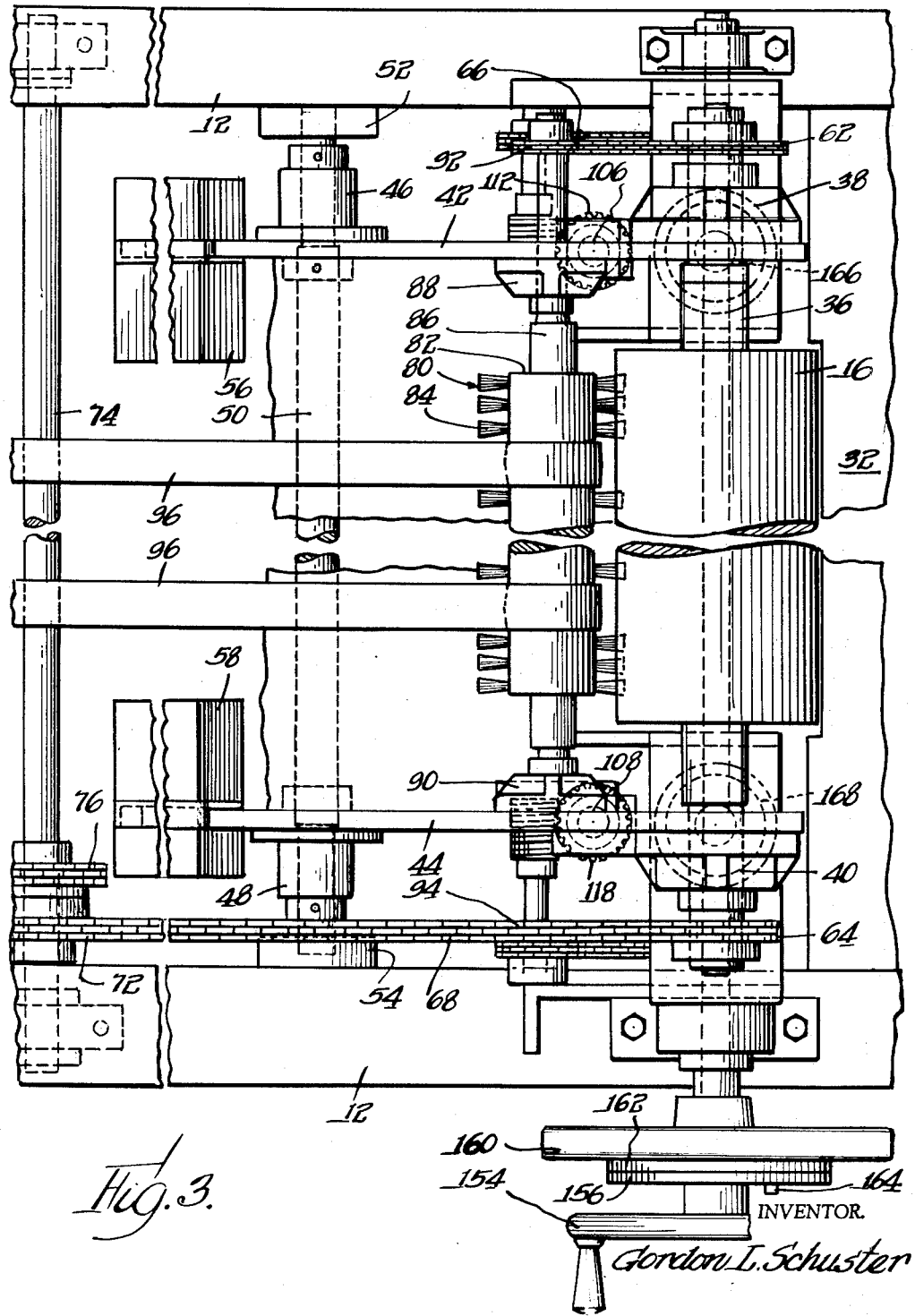
FIGURE 3 is a fragmentary plan view of the billy roll and mount shown in FIGURE 2.

Referring now, especially to FIGURE 3, it may be seen that the billy roll 16 has a billy roll shaft 36 protruding from each end of the billy roll. One end of the shaft is mounted in billy roll bearing 38 and the other end is mounted in billy roll bearing 40. The billy roll bearings 38 and 40 are self-aligning bearings which allow the billy roll to tilt as will be seen hereinafter. The billy roll bearing 38 is mounted on arm 42 while billy roll bearing 40 is mounted on an identical arm 44. Arms 42 and 44 have pivot mounts 46 and 48, respectively, mounted therein through which extends a pivot shaft 50. The pivot shaft 50 is connected to pivot shaft mounts 52 and 54 which are fixed to suitable portions of the frame 12. Counterweights 56 and 58 are fixed to the arms 42 and 44, respectively, on the ends of the arms opposite to the ends to which the billy roll is attached. As may be seen in FIGURE 3, the counterweights are on the ends of the respective arms opposite the billy roll and the pivots for the respective arms are between the weights and the billy roll so that the weight of the billy roll is counterbalanced by the counterweights. Thus, the billy roll has a tendency to float about the pivot points.

Figure 2:
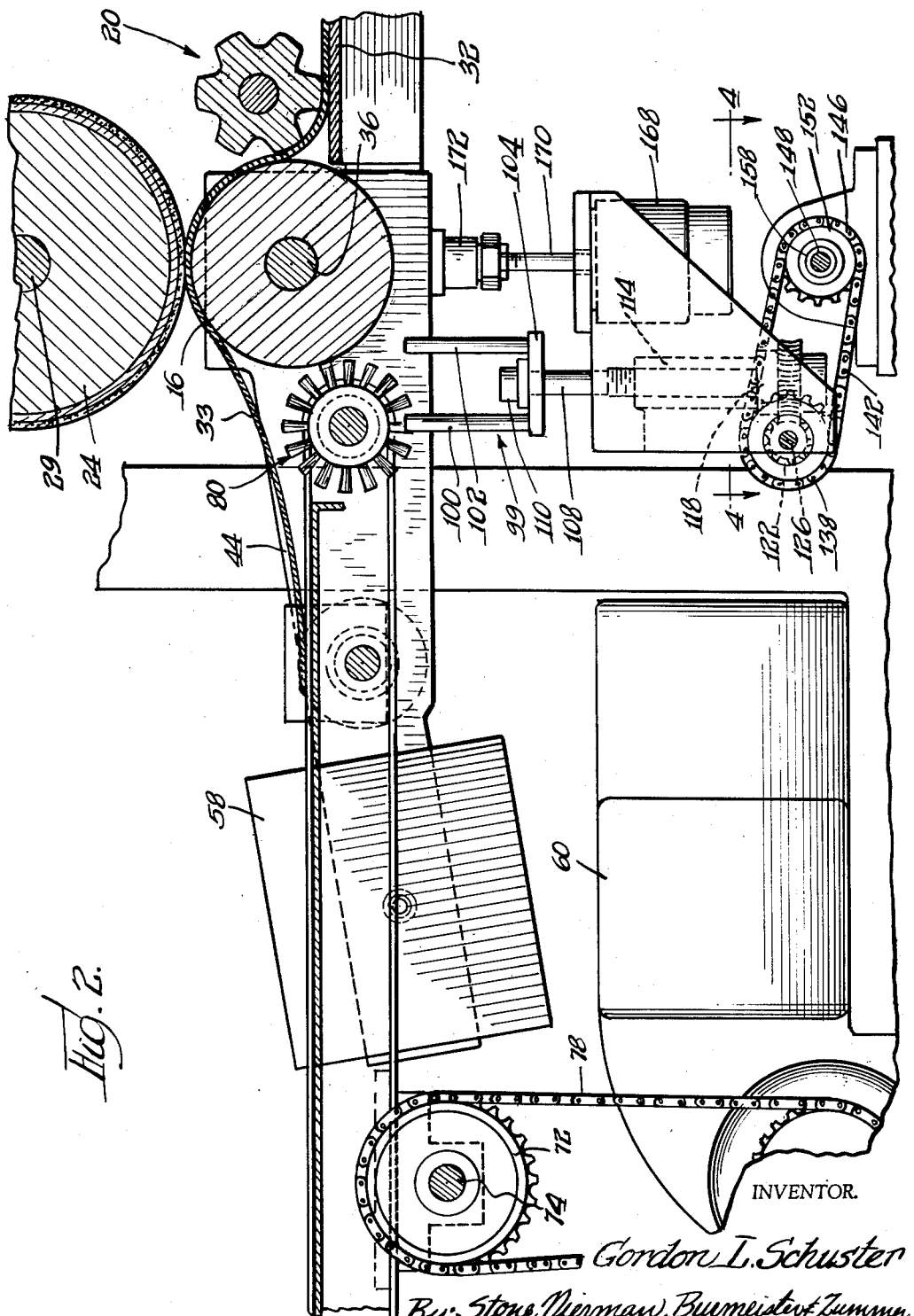
FIGURE 2 is a sectional enlarged view of a billy roll mount shown in FIGURE 1 and portions in cross section in order to show the relative position of the parts.

The billy roll 16 is driven by a variable speed motor 60 which is shown in FIGURE 2. The billy roll shaft 36 has a billy roll shaft sprocket 62 fixed to one end and a second billy roll shaft sprocket 64 fixed to the other end. The sprocket 64 is in engagement with a chain 68. The chain 68 is in turn in engagement with sprocket 72, which sprocket 72 is fixed to a drive shaft 74. The drive shaft has a drive sprocket 76 fixed thereon which sprocket is connected to the variable speed motor 60 through chain 78. Thus, the billy roll is driven by the motor 60 and the speed of the billy roll may be varied by varying the speed of the variable speed drive.

A brush 80 which is rotatably mounted on arms 42 and 44 is also driven by the variable speed drive 60 which brush engages the billy roll in order to clean the billy roll. The brush 80 includes a roll 82 which roll has a plurality of tufts 84 fixed therein for engagement with the billy roll 16. The roll 82 has a shaft 86 protruding therefrom, and a self-aligning bearing 88 mounted on arm 42 rotatably supports one end of the shaft. A second self-aligning bearing 90 mounted on arm 44 rotatably supports the other end of the shaft. The shaft 86 has a sprocket 92 fixed on one end which sprocket is in engagement with a chain 66 in engagement with sprocket 62 while the other end of the shaft has a sprocket 94 fixed thereon which sprocket 94 is in engagement with chain 68. In this manner the variable speed motor drives not only the billy roll but also the brush 80 so that the relative speeds of the billy roll and brush are maintained constant. A plurality of belts 96 are mounted in engagement with roll 82 between tufts 84. In this instance 12 belts are used, though only two are shown in FIGURE 3. The belts 96 are placed around an idler roll 98 which is rotatably mounted in frame 12 as may be seen in FIGURE 1 so that material passing between the billy roll and the abrading belt 26 is carried away by the belts 96.

Adjustment of the billy roll relative to the work roll and the abrading belt is accomplished by an adjustment means which is mounted on frame 12 and is connected to the arms 42 and 44. Each of the arms has an identical adjustment connector 99 fixed to it (the connector for arm 42 is not shown). Each of the connecters 99 includes a pair of uprights 100 and 102. Each pair of uprights is fixed to its respective arm and each pair of uprights has an ear 104 fixed to the lower portion of the uprights to provide a connecting means. A threaded rod 106 is slideably mounted in the ear which is attached to arm 42, and an identical threaded rod 108 is slideably attached to the ear which is connected to arm 44. Although each of the threaded rods 104 and 106 is slideable in its respective ear, they are not rotatably connected to their ears for reasons which will become apparent hereinafter. Each of the threaded rods 106 and 108 has a stop 110 fixed thereon so that the threaded rods will not pull out of the respective ears. Threaded rod 106 is threadedly connected to an internally threaded sleeve 112 while threaded rod 108 is threadedly connected to an identical internally threaded sleeve 114. A wheel 116 is fixed to internally threaded sleeve 112 and an identical wheel 118 is fixed to internally threaded sleeve 114. The wheels 116 and 118 engage worms 120 and 122, respectively, which worms 120 and 122 are a portion of shafts 124 and 126, respectively. Shaft 124 is rotatably mounted in bearings 128 and 130 which are mounted on a suitable portion of frame 12. Shaft 126 is rotatably mounted in bearings 132 and 134 which bearings 132 and 134 are mounted on a portion of frame 12. Shafts 124 and 126 have sprockets 136 and 138, respectively, fixed thereon for a driving connection for the worms and wheels. A chain 140 is in engagement with sprocket 136 while a similar chain 142 is in engagement with the sprocket 138. From the foregoing it may be seen that above described portions of the adjustment means for each of the arms 42 and 44 are identical. The chains 140 and 142 are engageably connected to sprockets 144 and 146. The sprocket 144 is fixed to a long adjustment shaft 148 which shaft has one end rotatably mounted in bearing 150 and the other end passes through bearing 152 and is connected to wheel 154 and a plate 156. The other sprocket 146 is connected to a short adjustment shaft 158 which shaft is hollow and rotatably receives the long adjustment shaft 148. The short adjustment shaft 158 is rotatably mounted in bearing 152 and has wheel 160 connected to it as well as plate 162. The plate 162 has a plurality of holes therein, as does plate 156 so that a pin 164 may be positioned in the holes in the plates to lock the plates to each other in order to lock the shafts to each other for simultaneous rotation.

Resilient means are mounted on frame 12 and in engagement with arms 42 and 44 to urge the billy roll toward the work roll. The resilient means in this instance are pneumatic cylinders 166 and 168 which are connected to arms 42 and 44, respectively. Inasmuch as the cylinders have an identical construction, only cylinder 168 is shown in full view along with the connection of cylinder 168 to arm 44 in FIGURE 2. The cylinder 168 has a rod 170 which protrudes therefrom and the rod 170 is attached to arm 44 by means of a cylinder connector 172. Both of the cylinders 166 and 168 are connected to a conventional source of air under pressure, which is not shown, in order to regulate the force applied by the cylinders in a conventional fashion.

The operation of the abrading machine 10 is conventional in many respects. However, the improved billy roll mount allows the billy roll to be tilted relative to the work roll so that tapered work pieces may be conveniently handled. Assuming that a hide which is split in the middle is to be abraded, the billy roll is tilted relative to the work roll an appropriate amount. Pin 164 is removed so that adjustment shafts 148 and 158 may rotate independently. The adjustment wheel 154 is rotated so that adjustment shaft 148 drives shaft 124 through sprockets 144 and 136 by means of chain 140. As the shaft 124 rotates so does worm 120 to drive wheel 116. As wheel 116 rotates, the internally threaded sleeve 112 rotates. By proper rotation of adjustment wheel 154, the threaded rod 106 is pulled downward thus pulling down the arm 42, inasmuch as the stop engages the ear which is fixed to the arm. Next, the other end of the billy roll is adjusted relative to the work roll to provide the proper tilt of the billy roll. Wheel 160 is rotated to rotate the short adjustment shaft 154, thus driving shaft 126 through sprockets 138 and 146 by means of chain 142. The rotation of the shaft drives wheel 118 by means of worm 122 which rotates the internally threaded sleeve 114, thus drawing or pushing threaded rod 108 relative to the sleeve. In this manner, the arm 44 may be appropriately raised or lowered inasmuch as the stop 110 moves the ear 104 relative to the rod 108 in one direction. The two pneumatic cylinders 166 and 168 urge the arms 42 and 44, respectively, upward against the stop on the respective threaded rods. Thus, the billy roll is constantly urged upward toward the work roll. It may be appreciated that inasmuch as the pneumatic cylinders operate by air pressure, the amount of force applied by the cylinders may be selectively regulated. After the tilt of the billy roll is determined, pin 164 is placed in the plates 156 and 162 to lock the plates together so that the shafts 148 and 158 rotate in unison. Thus, the billy roll may be moved up and down relative to the work roll but with a constant tilt to the billy roll relative to the work roll.

The work piece 33 is then placed on table 32 and fed into the conventional spreader assembly 20 which spreader assembly spreads the work piece and the rotation of the billy roll draws the work piece into the space between the billy roll and the abrading belt 26. The work roll is driven by a suitable drive means (which is not shown) so that the abrading belt moves relative to the work piece as well as movement of the work piece relative to the abrading belt. As the work piece passes between the billy roll and the abrading belt which is around the work roll 24, the work piece then falls onto belts 96 and is carried toward the idler roll 98. The billy roll is constantly cleaned by the brush 80 during the rotation of the billy roll.

As the work piece enters the space between the billy roll and the work roll, the thickness of the work piece presses the billy roll against the force of the pneumatic cylinders. The arms 42 and 44 are pushed down and the ends connected to the arms slide down along the threaded rods 106 and 108. Thus, there is a give to the billy roll, although the tilt of the billy roll relative to the work roll is substantially maintained. It is clear that there is no excessive abrasion of one edge of the work piece relative to the other edge, nor is there an insufficient amount of abrasion of one edge of the work piece relative to the other edge of the work piece. There is a uniform abrasion over the entire surface thereby eliminating waste in the work piece and improving the efficiency of the abrading machine. Inasmuch as the billy roll is balanced by the counterweights, it is only the pneumatic cylinders which provide the force against the abrading belt thereby providing a high degree of regulation of force of the work piece against the abrading belt. Furthermore, it may be appreciated that inasmuch as the billy roll is balanced by the counterweight, the size of the pneumatic cylinders need not be excessive in order to make the machine operative and a high degree of control is achieved.

The advantage of the instant billy roll mount is that substantial quantities of cow hide are saved while providing a uniform surface. Referring to FIGURE 6, the thicker side of the cow hide at 170 can be used for one purpose, while thinner side 172 can be used for another purpose. The finish on the two surfaces is uniform and there is little wastage.

Although a specific embodiment of the herein disclosed invention has been shown and described, it is readily apparent that those skilled in the art may make various and sundry modifications and changes without departing from the spirit and scope of the instant invention. Therefore, it is to be expressly understood that the present invention is limited only by the appended claims.

What is claimed is:

1. In an abrading machine for abrading materials having a variation in thickness, including a frame, a work roll rotatably mounted on said frame, and a billy roll rotatably and movably mounted on said frame, the improvement comprising, in combination, a first resilient means urging one end of the billy roll toward the work roll, a second resilient means urging the other end of the billy roll toward the work roll, a first tilt adjustment control means cooperative with the first-mentioned end of the billy roll to control the proximity of that end of the billy roll to the work roll, a second tilt adjustment control means cooperative with the other end of the billy roll to control the space between the other end of the billy roll and the work roll, independent of the first tilt adjustment control means, and means for selectively locking the first and second tilt adjustment control means together to raise and to lower both ends of the billy roll simultaneously, whereby the adjustment control means are adjustable to selectively tilt the billy roll relative to the work roll while the resilient means urge constantly the billy roll toward the work roll.

2. In an abrading machine for abrading materials having a variation in thickness including, a work roll, a billy roll cooperative with the work roll, and a frame rotatably supporting the work roll, the improvement comprising, in combination, a pair of independent arms pivotally mounted on the frame and rotatably supporting the billy roll, a counterweight mounted on each of the arms for urging the billy roll toward the work roll, adjustment means connected to each of the arms for selectively controlling the proximity of each end of the billy roll to the work roll, and means for selectively locking the adjustment means together for positioning the billy roll relative to the work roll.

3. In an abrading machine for abrading materials having a variation in thickness including a frame, a work roll rotatably mounted on said frame, and a rotatable billy roll cooperative with said work roll, the improvement comprising, in combination, a pair of arms pivotally mounted on the frame and rotatably supporting the billy roll, a counterweight mounted on each of the arms balancing the billy roll, adjustment means connected to each arm for controlling independently the proximity of each end of the billy roll to the work roll and including a slideable rod for allowing displacement of the billy roll from the work roll by a work piece, means for selectively locking the adjustment means together to move simultaneously both arms for adjusting both ends of the billy roll relative to the work roll, and a pneumatic cylinder attached to each of the arms urging the billy roll toward the work roll.

4. In an abrading machine for abrading materials having a variation in thickness including a frame, a work roll rotatably mounted on said frame, and a billy roll cooperative with said work roll, the improvement comprising, in combination, a first arm rotatably supporting one end of the billy roll at one end, a counterweight attached to the other end of the arm, a pivot mount attached to the arm between the counterweight and the billy roll pivotally attaching the arm to the frame, a first resilient means cooperative with the arm urging one end of the billy roll toward the work roll, first adjustment means cooperative with the arm controlling in one direction the proximity of the one end of the billy roll to the work roll, a second arm rotatably supporting the other end of the billy roll at one end, a second counterweight attached to the other end of the second arm, a second pivot mount attached to the second arm between the second counterweight and the billy roll pivotally attaching the second arm to the frame, a second resilient means cooperative with the second arm urging the other end of the billy roll toward the work roll, second adjustment means cooperative with the second arm controlling in one direction the proximity of the other end of the billy roll to the work roll independent of the first adjustment means and means for selectively locking the first and second adjustment means together for positioning the billy roll relative to the work roll.

5. In an abrading machine for abrading materials having a variation in thickness including, a frame, a work roll rotatably mounted on said frame, and a billy roll cooperative with said work roll, the improvement comprising, in combination, a first arm pivotally mounted on the frame and rotatably supporting one end of the billy roll at one end, a counterweight attached to the other end of the arm for balancing the billy roll, a first resilient means cooperative with the arm urging one end of the billy roll toward the work roll, adjustment means cooperative with the arm controlling in one direction the proximity of the one end of the billy roll to the work roll, a second arm pivotally mounted on the frame and rotatably supporting the other end of the billy roll at one end, a second counterweight attached to the other end of the second arm for cooperation with the first mentioned counterweight to balance the billy roll, a second resilient means cooperative with the second arm urging the other end of the billy roll toward the work roll, second adjustment means cooperative with the second arm controlling in one direction the proximity of the other end of the billy roll to the work roll, and means for selectively coupling the first mentioned and the second adjustment means to move simultaneously both arms for adjusting both ends of the billy roll relative to the work roll.

6. In an abrading machine for abrading materials having a variation in thickness including, a frame, a work roll rotatably mounted on said frame, an abrasive strip mounted on said work roll, and a billy roll cooperative with said work roll to hold materials in abrasive engagement with the abrasive strip, the improvement comprising, in combination, a rod connected to one end of the billy roll for adjusting the tilt of the billy roll relative to the work roll, a sleeve threadedly connected to the rod for moving the rod relative to the sleeve, a wheel drivingly connected to said sleeve, a worm in engagement with said wheel to rotate the sleeve to move the billy roll relative to the work roll, a second rod connected to the other end of the billy roll to adjust the tilt of the billy roll relative to the work roll, a second sleeve threadedly connected to the second rod, a second wheel drivingly connected to said second sleeve for adjusting the position of the second rod relative to the second sleeve to adjust the tilt of the billy roll, a second worm in engagement with the second wheel to rotate said second sleeve for adjusting the billy roll, a shaft drivingly connected to the first-mentioned worm for adjusting the position of one end of the billy roll relative to the work roll, a second shaft telescoped with the first-mentioned shaft connected to the second worm for adjusting the position of the other end of the billy roll relative to the work roll, and means for selectively locking the shafts together for rotation in unison to move both ends of the billy roll relative to the work roll in unison.

7. In an abrading machine for abrading materials having a variation in thickness including, a frame, a work roll rotatably mounted on said frame, an abrasive strip mounted on said work roll, a billy roll cooperative with said work roll to hold materials in abrasive engagement with the abrasive strip, and a brush rotatably engageable with said billy roll for cleaning said billy roll, the improvement comprising, in combination, an arm rotatably supporting one end of said billy roll through a self-aligning bearing and one end of the brush through a self-aligning bearing, a pivot mount pivotally supporting the arm on the frame, a counterweight mounted on said arm adjacent to one end opposite the end adjacent to the billy roll, a second arm rotatably supporting the other end of the billy roll through a self-aligning bearing and the other end of the brush through a self-aligning bearing, a second pivot mount pivotally supporting the second arm on the frame, a plurality of belts in engagement with the brush and extending away from the billy roll, a second counterweight mounted on said second arm adjacent to one end opposite the end adjacent to the billy roll, a first pneumatic cylinder mounted on the frame and being connected to the first-mentioned arm adjacent to the end which is adjacent the billy roll to urge the adjacent end of the billy roll toward the work roll, an ear connected to the first-mentioned arm adjacent to the end connected to the billy roll, a rod slideably connected to said ear, a stop mounted on the rod limiting the sliding of the rod relative to the ear in the direction in which the end of the billy roll is urged by the first-mentioned pneumatic cylinder, said rod having external threads thereon, a sleeve having internal threads threadedly connected to said rod, a wheel drivingly connected to said sleeve, a worm in engagement with said wheel to rotate said sleeve to move the rod relative to the sleeve, a second pneumatic cylinder mounted on the frame and being connected to the second arm adjacent to the end adjacent to the billy roll to urge the adjacent end of the billy roll toward the work roll, a source of air under pressure connected to said pneumatic cylinders to regulate the force applied by the pneumatic cylinders to the respective arms, a second ear connected to the second arm adjacent to the billy roll, a second rod slideably connected to the second ear, a second stop mounted on the second rod limiting the sliding of the second rod relative to the second ear in the direction in which the end of the billy roll is urged by the second pneumatic cylinder, said second rod having external threads thereon, a second sleeve having internal threads threadedly connected to said second rod, a second wheel connected to said second sleeve, a second worm in engagement with said second wheel to rotate said second sleeve, a shaft connected to the first mentioned worm for adjusting the position of one end of the billy roll relative to the work roll, a second shaft telescoping with the first-mentioned shaft connected to the second worm for adjusting the position of the other end of the billy roll relative to the work roll, means for selectively locking the shafts together for rotation in unison, a sprocket connected to said billy roll, a second sprocket connected to said brush, and a chain engaging said sprockets and being connected to a drive means for driving simultaneously the brush and the billy roll.

References Cited in the file of this patent

UNITED STATES PATENTS

| | | |
|---|---|---|
| 1,374,194 | Furber | Apr. 12, 1921 |
| 2,248,191 | Pratt | July 8, 1941 |
| 2,699,016 | Sherrill et al. | Jan. 11, 1955 |
| 3,012,381 | Zimmerman | Dec. 12, 1961 |